Sept. 1, 1925.  
C. P. DEIBEL  
1,552,396  
DRY CELL  
Filed Dec. 15, 1924
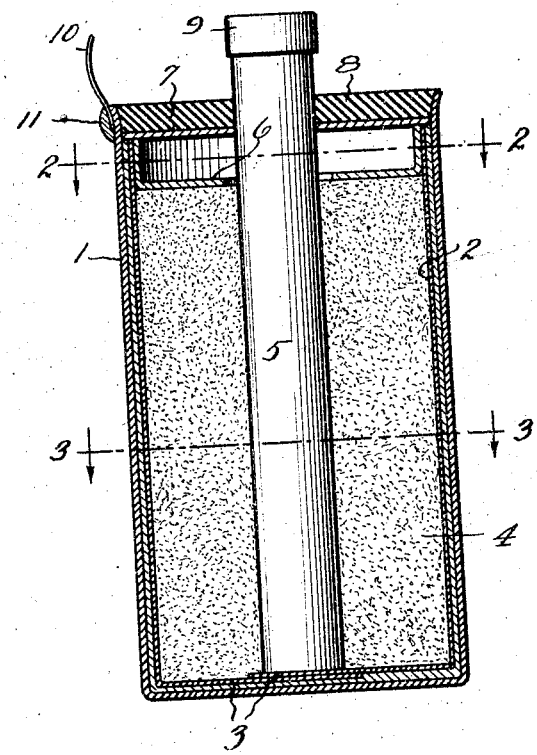
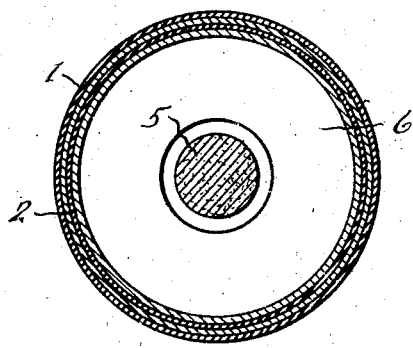
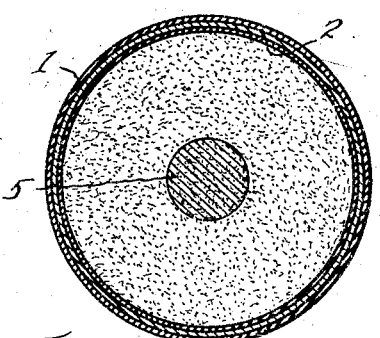
Inventor  
Cyril P. Deibel  
By Hull, Brock & West  
Attys Patented Sept. 1, 1925.

1,552,396

UNITED STATES PATENT OFFICE.

CYRIL P. DEIBEL, OF LAKEWOOD, OHIO, ASSIGNOR TO THE TWIN DRY CELL BATTERY COMPANY, OF CLEVELAND, OHIO, A CORPORATION OF OHIO.

DRY CELL.

Application filed December 15, 1924. Serial No. 755,878.

*To all whom it may concern:*

Be it known that I, CYRIL P. DEIBEL, a citizen of the United States, residing at Lakewood, in the county of Cuyahoga and State of Ohio, have invented a certain new and useful Improvement in Dry Cells, of which the following is a full, clear, and exact description, reference being had to the accompanying drawings.

This invention relates to improvements in the construction of dry cells and it is applicable to cells of practically all sizes, embracing those ranging from the smaller flashlight sizes to the standard six inch size. Among the flashlight sizes are cells that are being used extensively in the so-called "B" batteries of radio sets and it is to the construction of such batteries as these that my efforts are especially directed.

Flashlight cells, for example, those used in "B" batteries, are now generally made by molding a cake of mix about a carbon rod or pencil and wrapping the same in linen cloth about which a string is wound and tied to form what is referred to as the bobbin. This bobbin is then placed as nearly centrally as limited time and reasonable care will permit within a zinc cup, in the bottom of which there is usually a paper disk to keep the mix from contacting with the zinc bottom. This cell is known in the trade as the "bag type" cell.

A very common fault in cells of this construction is that the bobbin, being not centrally arranged in the cup, contacts with the side wall, thus rendering the cell internally defective, and one such cell in a "B" battery of fifteen cells cause the entire battery to be correspondingly defective. The battery as a whole is only as good as its weakest cell. Furthermore, when the bottom of the cup is covered by a paper disk, no use is obtained from the bottom and the life of the cell is proportionately shortened. Cells constructed as described can not be hermetically sealed because internal pressure due to the generation and expansion of gases within the cell will "blow" the seal, and not being hermetrically sealed, air is permitted to pass in and out as the temperature fluctuates and this condition is very damaging to the cell. Also, expensive low resistance materials have to be used in cells so made in order that the cell may properly function under heavy current drains. This is on account of the fact that the mix is not tamped or compressed and thus rendered sufficiently dense to reduce internal resistance by this means.

Aside from these inherent defects, cells constructed as above set forth can not be entirely reduced to automatic manufacture. The seriousness of this objection has been increased many fold since the advent of the radio. With the demand as it is to-day anything effecting an increase in production and a decrease in cost is enthusiastically welcomed by the industry.

The primary purpose of my invention is to so construct a dry cell that it may be made entirely by automatic machinery thus greatly increasing the volume, and reducing the cost, of production and insuring a uniform high quality of product.

My improved dry cell is adapted to be constructed in accordance with the process disclosed and claimed in an application filed concurrently herewith by Walter G. Waitt and myself, and titled "Method of producing dry cells."

Further objects of my present invention are to provide a highly efficient yet comparatively inexpensive dry cell having a long shelf life as well as a long active life. Factors contributing to these results are the use of a maximum amount of mix in a cup of given size and the availability of the bottom of the cup as a part of the active agent or anode, no disk being required in the bottom of the cup according to my construction. I employ a cup lining of suitable absorbent paper, folded across the bottom of the cup in place of the usual paper disk. This insures against the mix contacting with the cup at any point yet upon the paper being subsequently saturated with water or suitable electrolytic solution effectively establishes solution contact between the mix and the cup throughout the area of the sides and bottom of the mix. I highly compress the mix within the cup, thus allowing the use of more mix than would otherwise be possible. This compression of the mix also materially reduces internal resistance, permitting a cheaper grade of materials to be used than is practical were the mix not highly compressed. My cell is known in the trade as the "non-bag type" cell as distinguished from the "bag type" cell hereinbefore referred to.

A further object is to provide a hermitically sealed dry cell of the class to which the invention especially pertains. This is made possible by the inclusion of an expansion chamber within the cell allowing for the expansion and contraction of air or other gases in the cell without imposing undue strains upon the seal.

The objects above set forth, with others hereinafter appearing, are attained in the construction illustrated in the accompanying drawing wherein Fig. 1 is a central vertical section through my improved dry cell; and Figs. 2 and 3 are transverse sections on the respective lines 2—2 and 3—3 of Fig. 1.

The cup, which is designated 1, is made of zinc or equivalent metal, and in those sizes of cells where such treatment of the metal is practical, the cup is drawn from a single sheet. This is a method employed in the production of flashlight sizes. The cup is provided with a lining 2 of suitable absorbent material. I preferably use for this purpose paper that is made by the so-called sulphate process. By this process the fibers are neither shortened nor injured with the result that the paper is very strong. This paper is commonly known as the "kraft" variety. Prior to forming the lining in the manner presently to be described, suitable flour or starch paste, is applied to the paper, preferably on one side only, and the paste and paper are allowed to thoroughly dry. The paper is then wound about in one or more layers to correspond in size and shape with the interior of the cup and at one end is folded inwardly, as shown at 3, to form a bottom.

After the lining is placed within the cup a cake 4 of suitable depolarizing mix, containing the cathode 5 in the form of a carbon rod or pencil, is inserted into the lined cup, and is highly compacted therewithin, the top surface of the mix, after the mix is compressed, being spaced a considerable distance below the top edge of the lining which, in turn, as will be observed from Fig. 1, is spaced a suitable distance from the open end of the cup. A dished washer 6 occupies the open end of the lining and rests upon the mix while its rim extends up alongside the extended portion of the lining, the lining and rim of the dished washer terminating in approximately the same plane.

Before fully depressing the dished washer into the cup, it is temporarily spaced from the mix and engaged only a slight distance within the lining. While the dished washer is in this position, a quantity of liquid, such as water or a suitable electrolytic solution, is poured into the cell and allowed to run down through the central hole of the washer about the cathode onto the mix and thoroughly saturate the paper lining, as well as the paste which is carried thereby, causing the paste and the paper to expand. The pores of the paper become filled with the liquid and this effects solution contact between the mix and the wall of the cup, this condition extending throughout the area of the sides and bottom of the cup. When the liquid is absorbed the dished washer is pressed down against the mix, as illustrated, and a washer 7 is placed within the cup and brought to bear upon the edge of the lining and the rim of the dished washer. This is followed by the introduction of a quantity of sealing material 8 sufficient to completely fill the cup. The battery is completed by the application of the usual metal cap 9 to the cathode and a terminal 10 to the cup, the latter being shown as consisting of a suitable conductor that is fastened to the cup by a quantity of solder or the like, shown at 11.

The use of paper of the kind described for the lining 2 enables the mix to be inserted and highly compressed without danger of injuring the paper and with the assurance that the mix will at no point come in contact with the wall or bottom of the cup. The space enclosed by the washers 6 and 7 constitutes the expansion chamber previously referred to which allows for expansion and contraction of air or other gases within the cup without imposing such strains upon the sealing material as would be liable to rupture or loosen it.

Having thus described my invention, what I claim is:—

1. A dry cell of the non-bag type construction comprising a cup, a one piece lining of absorbent paper directly in contact with the wall of the cup and having an integral part folded inwardly across the bottom of the cup, the lining being permeated with electrolytic solution, a cake of depolarizing mix containing a cathode compressed within the lined cup, suitable material covering the mix, and means sealing the cup.

2. A dry cell of the non-bag type construction comprising a cup, a one piece lining of absorbent paper carrying a quantity of paste directly in contact with the wall of the cup and having an integral part folded inwardly across the bottom of the cup, the lining and paste being permeated with electrolytic solution, a cake of depolarizing mix containing a cathode compressed within the lined cup, a member extending across the end of the mix cake and covering the same, a second member disposed within the open end of the cup and spaced from the former member, and sealing means closing the cup above the second mentioned member.

3. A dry cell of the non-bag type construction comprising a cup, a lining of absorbent paper carrying a quantity of paste extending about the wall of the cup and having an integral part folded inwardly across the bottom of the cup, the lining and paste being permeated with electrolytic solution, a cake of depolarizing mix containing a cathode compressed within the cup, a dished washer applied to the mix cake and having its rim fitted within the open end of the lining, the rim of the washer and said lining terminating in approximately the same plane and spaced inwardly a suitable distance from the open end of the cup, a second washer within the cup and having its edge portion in juxtaposition to the rim of the first mentioned washer and the end of the lining, and sealing material closing the cup above the second mentioned washer.

4. A dry cell of the non-bag type construction comprising a cylindrical cup, a lining of tough absorbent paper, carrying a quantity of paste on its outer surface and wound about in one or more layers to fit the interior of the cup, the inner end of the lining being folded inwardly across the bottom of the cup, a cake of depolarizing mix, a carbon rod extending centrally through said cake and protruding beyond one end thereof, said cake being highly compressed within the lined cup, the top edge of the lining being spaced inwardly a suitable distance from the corresponding edge of the cup, and the adjacent end of the mix cake being spaced inwardly a material distance from the top edge of the lining, a dished washer applied to the end of the mix cake and having its rim engaged within the surrounding portion of the lining, the top edges of said rim and portion terminating in approximately the same plane, a second washer within the top of the cup and having its edge in juxtaposition to the top edges of the lining and dished washer, and sealing material above the second mentioned washer and hermetically sealing the cup, the lining and the paste being permeated with electrolytic solution.

In testimony whereof, I hereunto affix my signature.

CYRIL P. DEIBEL.